May 15, 1945. J. C. KREJCI 2,375,797
CARBON BLACK PROCESS AND APPARATUS
Filed March 27, 1942
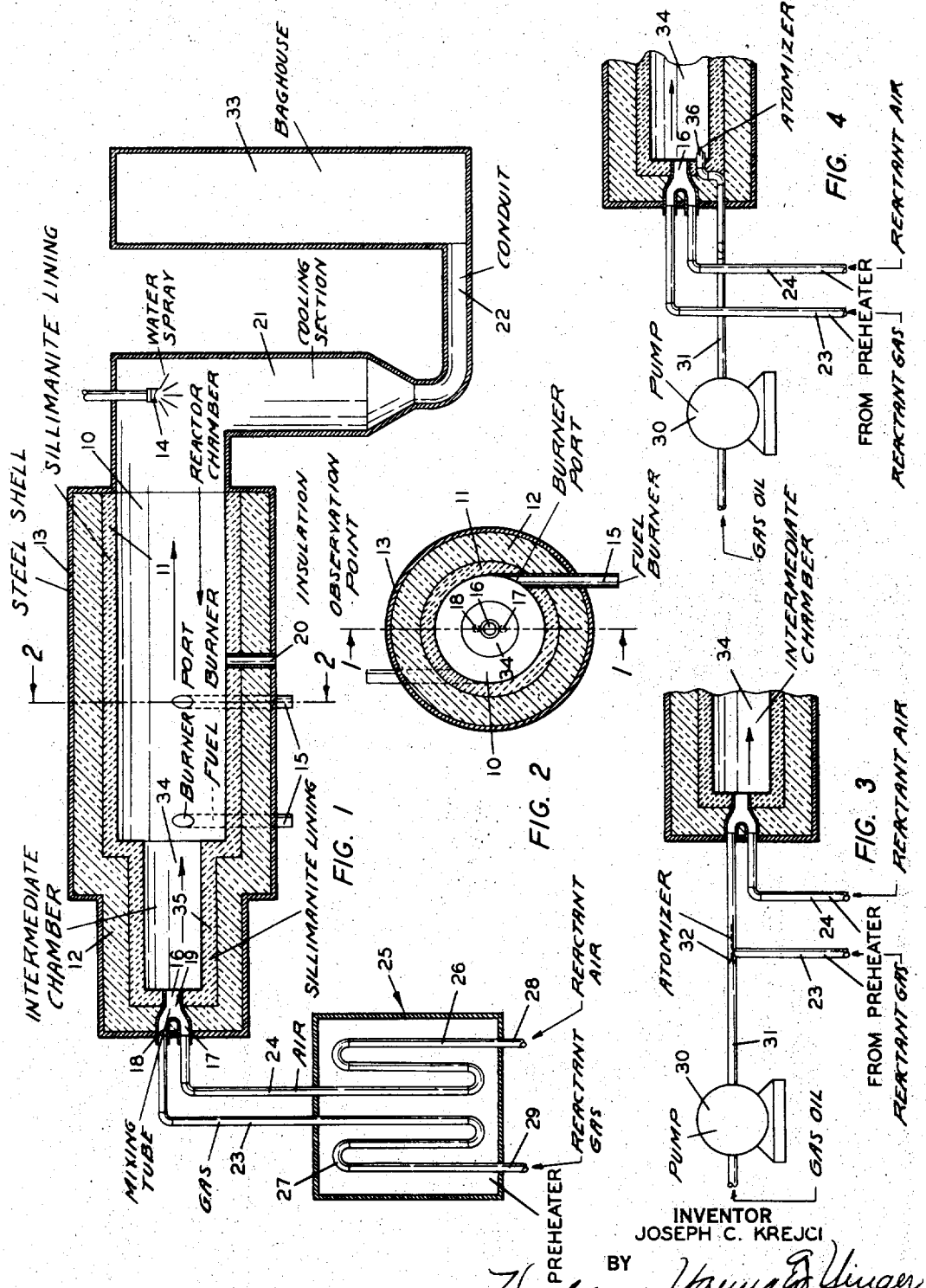
INVENTOR
JOSEPH C. KREJCI
BY
Hudson, Young & Yinger
ATTORNEYS Patented May 15, 1945

2,375,797

UNITED STATES PATENT OFFICE 2,375,797

CARBON BLACK PROCESS AND APPARATUS

Joseph C. Krejci, Kaw, Okla., assignor to Phillips Petroleum Company, a corporation of Delaware Application March 27, 1942, Serial No. 436,524

14 Claims. (Cl. 23—209.8)

This invention relates to a process for producing carbon black, and more particularly to an improved method of producing carbon black by incomplete combustion of carbonaceous gases and vapors or by decomposition thereof by contact with hot gases. This application is an improvement over my copending applications, Serial No. 424,084, filed December 22, 1941, and Serial No. 431,171, filed February 16, 1942.

At the present time, most of the carbon blacks of commerce are produced by a very few processes and these blacks may be grouped into classes depending upon the types of rubber compound and vulcanized rubber which the carbon blacks will produce. A soft carbon black as compared to a hard carbon black is one which when mixed in a conventional rubber compound and then vulcanized yields a product which is softer, more resilient, more rubbery and yet tough whereas a hard carbon black in the same compound imparts stiffer, tougher characteristics, with lower resistance.

These two types of carbon black may be considered essentially as "limits" and many of the carbon blacks produced will possess hardness properties intermediate these above limits.

The commercial "channel" process produces a hard type carbon black which is especially good for compounding automotive tire tread stocks that withstand abrasion and possess good physical test properties. However, the yield of carbon by this process is only about 3.5% of the carbon content of the gas from which it is made. Some other carbon black processes give higher yields of carbon than the channel process, but in essentially all cases these blacks are of a softer type and less desirable for use in good quality tire tread stocks. These latter blacks, however, find other and varied uses, which are minor as compared to the relatively large amounts of hard channel black which go into tires at the present time, and a process which would give a high yield of a hard black similar to channel black in properties, would be most desirable.

The present invention comprises improvements of the process and apparatus disclosed in the aforementioned copending applications. In one specific embodiment, it comprises the use of an insulated reaction or soaking chamber (to be referred to hereinafter as an intermediate chamber) that is ahead of the main reaction chamber and that incidentally serves as the inlet tube to the latter. In a preferred form, my improved process as herein disclosed comprises (1) a preheating step, (2) an intermediate soaking or partial combustion in which the temperature and/or the content of unsaturated hydrocarbons is increased, (3) and the conversion to carbon black in the main reaction chamber in which the tangential flow of gases is utilized. In this improved process the preheating is advantageous because, without preheating any of the reactants entering the intermediate chamber, this chamber could carry out its functions only to a limited extent.

The principal object of this invention is to provide an apparatus and a process for producing carbon black of high yield and of high quality comparable to or superior to the present day "channel black" for use in tire stocks.

Another object of this invention is to improve on the present day art of producing carbon black by providing an apparatus and a process which will produce carbon black out of contact with solid surfaces without depending on maintenance of streamline flow conditions as in some other processes, and with an extremely short reaction time.

Still another object of this invention is to provide a carbon black making process which is flexible in operation and especially in the respect that a product of essentially any desired properties ranging from those of the conventional soft carbon blacks, through the intermediate blacks, to the hard channel blacks, or even harder, can be produced with the same apparatus and raw materials merely by alteration and control of the operating conditions.

Other specific objects of the present invention are: to increase the yield of carbon black, to improve the quality of the carbon black, to lower the amount of tangential fuel required in the main chamber to produce a given yield of carbon black of any given quality, and to lower the preheat temperature required to give any given results.

Still other objects and advantages will be apparent to those skilled in the art from a careful study of the following description and disclosure:

In the accompanying diagrammatic drawing, which is a part of this specification and which illustrates a preferred form of the apparatus for carrying out my invention, Figure 1 is a longitudinal section of a preferred form of the reaction chambers with the preheating equipment in diagrammatic form.

Figure 2 is a cross-sectional view of the preferred form of the reaction chamber along the line 2—2 of Figure 1.

Figure 3 is a diagrammatical view of one form of a feeder for adding gas oil to the preheated reactant gas previous to its passage into the intermediate chamber.

Figure 4 shows in diagrammatical form a preferred method of addition of the heavy gas oil feed to my carbon black making apparatus.

Like numerals on the several figures refer to the same or similar parts. These figures have been made in diagrammatic form only, and such conventional and well-known parts as valves, flow meters, pressure regulators, temperature measuring devices, etc., for simplicity have not been shown.

Referring to the drawing, cylindrical reaction chamber 10 has a lining 11 of a highly refractory material such as sillimanite, an aluminum silicate or alundum, an artificial oxide of aluminum. Likewise, cylindrical intermediate chamber or reactor 34 has a lining 35 of a highly refractory material, and may well be of alundum also. Between refractory liners 11 and 35 and cylindrical steel shell 13 is a layer of insulating material 12. Chamber 10 is equipped with one or more fuel burners 15 extending through the chamber wall and terminating in an oval-shape opening such that the incoming gaseous fuel mixture enters the reaction chamber tangential to the inside cylindrical surface of the chamber and in a plane normal to the longitudinal axis thereof. The use of several tangential burners has been found advantageous in some modifications, and particularly in reaction chambers of large diameters. The burner nearest the inlet end of the chamber preferably is larger than the others, since it has been found advantageous to introduce most of the fuel near the inlet end of the chamber. Opening or openings 20 are for observation and temperature measuring purposes.

At its inlet end, chamber 34 is equipped with inlet tube 16 which is in line with the longitudinal axis of said chamber. If only one gas is admitted to the inlet end of the chamber, tube 16 extends through the refractory, the insulation, and the shell; but in case a mixture of two gases is admitted, a Y 19 is used, the reactant gas entering through gas leg 18 and the reactant air through air leg 17, the tube 16 serving as a mixing tube as well as the chamber inlet tube. Chamber 34 incidentally serves as the inlet tube to chamber 10, the effluent of said reactor 34 passing directly into the said chamber 10. The longitudinal axes of tube 16 and chamber 34 and 10 are in line.

The reactants, such as, for example, natural gas and air with less than sufficient air for complete combustion, in one method of operation enter the system through the gas inlet tube 29 and the air inlet tube 28, respectively, and are preheated in furnace 25 in pipe coils 27 and 26 and pass from this preheat furnace through pipes 23 and 24 into the intermediate reactor 34, the effluent therefrom passing directly into chamber 10.

The reaction products exit from the discharge end of chamber 10 and are cooled by any conventional means, such as by a water spray 14. The carbon black after cooling in cooling section 21 is transferred through conduit 22 and is separated from the gas by any carbon collecting system such as a baghouse 33.

In case gas oil is used as a source of carbon, this hydrocarbon liquid is pumped by pump 30 through line 31 and atomized by atomizer 32 into the preheated reactant gas pipe 23 as in Figure 3, or in case the gas oil is fed directly into the intermediate reactor, the oil is pumped by pump 30 through line 31 and atomized directly into the intermediate reactor 34 by atomizer or sprayer 36, as shown in Figure 4.

In the preferred method of operation of my invention, a mixture of fuel such as natural gas and air is introduced through tangential burners 15 at sufficient velocity as to cause the flame to adhere to the inside surface of chamber 10 and to form a blanket of flame and products of combustion over the chamber wall throughout its length. The velocity of the incoming fuel mixture through the tangential burner ports may vary over wide limits, but must necessarily be rather high to maintain by centrifugal force the blanket of flame and combustion products. The latter travel from the tangential burner inlet toward the outlet end of chamber 10, following a helical path adjacent the inside wall of the chamber, thereby forming substantially a continuous layer or blanket of flame and combustion products on the inside wall. This layer or blanket serves as a separating medium to prevent contact of the central contents of the chamber with the chamber walls. Furthermore, in order to prevent flashback, the velocity of the tangential fuel through the burner ports must be higher than the linear rate of flame propagation of the fuel mixture used. I have found that this velocity of tangential fuel flow may vary from as low as 30 feet per second to 200 feet per second, or even more. In one series of experiments, best results were obtained by maintaining this velocity within the range of 100 to 150 feet per second, or, flash-back may be prevented by mixing the tangential air and tangential gas at the tangential burner ports 15.

The preheating furnace may be a tube furnace or other type of furnace or heating means of suitable design, such that the gases undergoing preheating may be heated to temperatures within the range of say 1000° to 2600° F. and such that the heated gases may be at a predetermined temperature so that the operation of my invention may be properly carried out.

The preheated carbon-bearing gas, such as natural gas or a mixture of such gas and a preheated oxygen-bearing gas such as air, enters chamber 34 through tube 16. If the mixture is used, inlet tube 16 serves also as a mixing tube for the air and gas, such mixing increasing the effectiveness of the intermediate chamber 34. The carbon-bearing gas and the oxygen-bearing gas passed through tube 16 are hereinafter referred to as the reactant gas and the reactant air, respectively.

The chief function of the intermediate chamber 34 is to raise the temperature and/or the content of unsaturated hydrocarbons in the reactants before they enter main reaction chamber 10. Chamber 34 serves as a soaking chamber if a reactant gas alone is admitted into it through tube 16 and in addition as a partial combustion chamber if a mixture of reactant gas and reactant air are admitted. In the first case, the purpose of the chamber is to give the reactant gas additional time for cracking primarily to unsaturated hydrocarbons; in the second case, an additional purpose is to further the cracking and preheating of the reactants by utilizing heat furnished by combustion of a part of the reactant gas. The time-temperature conditions in the chamber are so regulated as to favor formation of unsaturated hydrocarbons without forming extensive amounts of carbon, which would tend to accumulate in this chamber. The time of reaction in the chamber may vary from a few thousandths of a second up to one second, or even more, depending on the richness of the reactant gas, the preheat temperature of the reactant gas and of the reactant air, the ratio of reactant air to reactant gas, and other factors. Since chamber 34 serves as the inlet tube to chamber 10 this function must be considered in selecting the diameter of chamber 34. In several cases, a suitable diameter for chamber 34 was found to be one which gave the gases in the chamber a linear velocity of the same order of magnitude as the linear downstream velocity of the gases in chamber 10. Chamber 34 directs its effluent along the longitudinal axis of chamber 10; this directing effect, in addition to the effect of the tangential flame, which keeps the reactant gas away from the walls of the chamber assures that the reaction to carbon black takes place in the central core of chamber 10.

The retention time in chamber 10 can be varied over wide limits. In one experiment the time was approximately 0.1 second. Although this particular retention time was held to about 0.1 second, it was found that the retention time may be varied, depending upon other conditions, from approximately 0.005 second to as long as 0.4 second, or even one second, and still obtain carbon black of good quality and high yield.

The temperature within chamber 10 may be varied within wide limits. For example, the chamber temperature in the above-referred-to experiment was varied within the range of 2000 to 3300° F. Optimum yields of excellent quality carbon black resulted when the temperature was of the order of 2300 and 2600° F.; however, high yields were obtained at chamber temperatures as high as 3100° F., and at temperatures lower than 2200° F. Thus, it can be seen that chamber temperature is not a highly critical operating condition and that it can be varied within very wide limits during the production of extraordinarily high yields of carbon black.

(reactant gas) containing 35 pounds of carbon per 1000 cubic feet, with my apparatus and in accordance with my process. All the experiments reported herein were made in a reaction chamber of 9½ inches in diameter and 46 inches long and with three tangential burners, 1, 6, and 11 inches from the inlet end of said chamber 10. The first and third burners were located as shown in Figure 1; the second burner shown in Figure 2 was half way between the first and third burners and at 180° around the circumference from them. About half of the tangential fuel was used in the first burner, and the remainder was divided approximately equally between the other two. As indicated in the second column of the table, in some of the experiments an intermediate chamber 34 was not used, tube 16 emptying directly into chamber 10; in other experiments, an intermediate chamber 2½ inches in diameter by 16 inches in length or 3 inches in diameter by 32 inches in length was used. Tube 16 in all cases was one inch in inside diameter and two inches in length. In the yield columns of the table, the higher values in the one column were based on the reactant gas and in the other column, the lower yields was based on the total gas used, which was the reactant gas plus the gas in the tangential fuel. This same natural gas was used as reactant gas and as tangential gas. The reactant gas and reactant air were heated individually but in the same preheat furnace and to the same temperature, as recorded in the third column of the table. It might be mentioned that the tangential burner fuel was composed of air and gas in the theoretical ratio for complete combustion to carbon dioxide and water, although this exact ratio was not necessary for the successful operation of the process.

TABLE I

Operating data

| Run Nos. | Intermed. chamber, inches | Preheat furnace temp., °F. | Reactants, cu. ft. per hr. | | Fuel to burners, cu. ft. per hr. | | Yield, lbs./MCF | |
|---|---|---|---|---|---|---|---|---|
| | | | Gas | Air | Gas | Air | Reactant gas basis | Total gas basis |
| B206 | None | 2,000 | 1,200 | 0 | 600 | 6,600 | 9.2 | 6.1 |
| B243 | 2½ x 16 | 2,000 | 1,200 | 0 | 600 | 6,600 | 13.1 | 8.8 |
| B216 | None | 1,600 | 1,200 | 0 | 700 | 7,700 | 4.9 | 3.1 |
| B234 | 2½ x 16 | 1,600 | 1,200 | 0 | 700 | 7,700 | 6.5 | 4.1 |
| B329 | 3 x 32 | 1,600 | 1,200 | 0 | 600 | 6,600 | 5.4 | 3.6 |
| B221 | None | 1,600 | 1,200 | 600 | 700 | 7,700 | 2.3 | 2.0 |
| B235 | 2½ x 16 | 1,600 | 1,200 | 600 | 700 | 7,700 | 4.8 | 3.0 |
| B328 | 3 x 32 | 1,600 | 1,200 | 600 | 600 | 6,600 | 4.6 | 3.1 |
| B330 | 3 x 32 | 1,600 | 1,200 | 600 | 500 | 5,500 | 5.7 | 4.0 |
| B212 | None | 1,600 | 800 | 0 | 600 | 6,600 | 6.0 | 3.4 |
| B236 | 2½ x 16 | 1,600 | 800 | 0 | 600 | 6,600 | 5.2 | 3.0 |
| B332 | 3 x 32 | 1,600 | 800 | 0 | 500 | 5,500 | 4.2 | 2.6 |
| B333 | 3 x 32 | 1,600 | 800 | 0 | 400 | 4,400 | 5.8 | 3.8 |

The herein disclosed tangential flame serves several purposes, and its proper use makes possible continuous operation of my process and apparatus without deposition of carbon on the chamber walls. The flame covering the walls serves as a mechanical separator or partition to prevent contact of the reactant gases with the chamber walls. Furthermore, any particles of carbon which may get into the layer of flame are subjected to the water-gas reaction; and, in case any particles do come in contact with the walls, they are swept away by the helically traveling tangential flame.

Table I shows operating data taken during the manufacture of carbon black from natural gas In all the runs of Table I the amount of tangential fuel used was sufficient to keep the wall of chamber 10 free of carbon except in run B333, in which a thin layer of carbon was deposited on the wall in the last half of the chamber. No carbon deposited inside of the intermediate chamber 34, or the amount was so small as to be unnoticed.

A study of the results in Table I reveals that the use of the intermediate chamber or reactor improved the yield of carbon black in most cases; lowered the amount of acetone extractable matter in the product (see Table III), and particularly in the case of the 3 x 32 inch intermediate reactor lowered the amount of tangential fuel required in chamber 10. One of the most important results of the use of an intermediate chamber is the lowering of the preheat temperature required to produce carbon black of any given quality and yield, or to improve the quality and yield of carbon black made from reactant gas of the same preheat temperature over that made without the use of the intermediate chamber. The superiority of the 32 inch intermediate chamber or reactor over the 16 inch one demonstrates the value of additional soaking and reaction time before the final reaction in the carbon producing chamber 10.

My process is not limited to the use of natural gas as the carbon containing gas or to condensable hydrocarbons or even to normally liquid hydrocarbons since hydrocarbons as heavy as gas oils may be used. Several experiments were made and reported herein in Table II using a recycle gas oil as the carbon containing material. This gas oil was atomized or sprayed as a fine mist into my carbon black system as at point 32 of Figure 3 or as at point 36 of Figure 4. Complete vaporization of the oil is conductive to formation of small particle carbon black, whereas, if the oil entered reaction chamber 10 in the form of droplets, relatively large particles of carbon black containing tarry matter would result. Thus, the method and point of addition of the oil are of primary importance. On the other hand, the time of heating of the oil must not be too long as this would lead to excessive cracking of the heavy oil and plugging of the preheated reactant gas tube with carbon. Addition of a heavy cracking oil to the reactant gas inlet 29 of the preheat furnace would materially lower the temperature at which the preheat furnace 25 could be operated. If the oil is added directly to the intermediate reactor as at point 36 of Figure 4, the reactor or intermediate chamber 34 must be sufficiently large to permit complete vaporization of the oil, but not so large as to allow excessive formation of carbon from the oil in this portion of the apparatus. I have found that this latter point of addition of such heavy oils as the herein disclosed recycle gas oil is to be preferred. It is apparent then that the preheat step in my process plays a double role and is definitely interrelated with the gas oil or heavy hydrocarbon addition step. If this apparatus embodiment of Figure 1 is used and the carbon containing oil atomized into the preheated reactant gas as in the embodiment of Figure 3, the preheat furnace not only preheats the reactant gas, but also furnishes all the heat required for the vaporization of the oil except for any vaporization which might take place in tube 16, in which case a part of the heat would be furnished by the preheated air or by partial combustion of the reactant gas in the tube 16. If the apparatus embodiment of Figure 1 is used and the heavy carbon-containing oil added as at point 36 in the embodiment shown in Figure 4, the preheat furnace heats the reactant gas and furnishes a part of the heat for the vaporization of the oil, the remainder being furnished by the preheated air or by partial combustion of the reactant gas in the intermediate chamber 34.

Table II below shows the operating data taken when manufacturing carbon black from natural gas (reactant gas) containing 35 pounds of carbon per 1000 cubic feet and a recycle gas oil of 18.4° A. P. I. gravity when using my apparatus and according to my process as herein disclosed. In these experiments also three tangential burners were used in chamber 10 in the same relation as above disclosed.

TABLE II

*Operating data*

[9½ by 46 inches reaction chamber with 4½ by 16 inches intermediate reactor]

| Run No. | Temp., °F. | Reactants, cu. ft. per hr. | | Fuel to burners, cu. ft. per hr. | | Gas oil rate, gals./MCF of reactant gas | Carbon black | |
|---|---|---|---|---|---|---|---|---|
| | | Gas | Air | Gas | Air | | Yield, lbs./MCF reactant gas basis | Blending value of gas oil, lbs./gal. |
| B287 | 1,600 | 800 | 800 | 600 | 6,600 | 0 | 3.7 | |
| B292 | 1,600 | 800 | 800 | 600 | 6,600 | 1.18 | 12.4 | 7.4 |
| B293 | 1,600 | 800 | 800 | 600 | 6,600 | 3.75 | 25.3 | 5.7 |
| B284 | 1,600 | 1,200 | 1,120 | 700 | 7,700 | 0 | 3.9 | |
| B296 | 1,600 | 1,200 | 1,080 | 700 | 7,700 | 1.38 | 11.4 | 5.4 |
| B297 | 1,600 | 1,200 | 1,080 | 700 | 7,700 | 3.05 | 22.3 | 6.0 |

About half of the tangential fuel as in the other experiments was used in the burner nearest the inlet end and the remainder was divided about equally between the other two burners. In column 8 of this Table II headed "carbon black, yield, lbs./MCF reactant gas basis" are given the pounds yield of carbon black per 1000 cubic feet of reactant gas disregarding the feeding or time rate of feeding of the gas oil into the preheated reactant gas. The blending values for the gas oil were obtained by subtracting the yield of carbon black from the reactant gas alone in the blank experiments in which no gas oil was used from the yield from the reactant gas plus gas oil (column 8) and dividing the difference by the oil feed rate per 1000 cubic feet of reactant gas (column 7). In all of the runs reported in this table, the amount of tangential fuel used was sufficient to keep the reaction chamber wall free of carbon. The addition of the recycle gas oil to the reactants did not materially affect the amount of tangential fuel and reactant air required to produce a carbon black low in tarry material. All of the samples produced were low in acetone extractable content as may be seen from Table IV. The yield of carbon black from the gas oil was very high, averaging more than 5 pounds carbon black per gallon of oil.

One of the outstanding advantages of my process lies in the fact that although the yield is exceptionally high, the quality is in most respects equal and in some respects superior for tire tread stock purposes to conventional channel black. The channel black of commerce is used herein as a standard of tire tread stock quality since this black is acceptable to tire manufacturers. To illustrate the quality of the carbon black made as herein disclosed and to compare its properties with those of channel black, batches of rubber compound were prepared according to the following formula:

| | Parts by weight |
|---|---|
| Smoke sheet | 100 |
| Carbon black | 50 |
| Zinc oxide | 5 |
| Sulphur | 3 |
| Stearic Acid | 3 |
| Phenyl B-napthylamine | 1 |
| Captax | 0.9 |
| Pine tar | 3 |

The stress-strain results at various vulcanizations are given in Tables III and IV. The standard (channel black) was vulcanized at 274° F., whereas all the samples made according to the process herein disclosed were vulcanized at a lower temperature (260° F.) because of their fast vulcanizing properties. The resilience in per cent of test pieces vulcanized for 70 minutes as measured with a Yerzley oscillograph is recorded in the table.

In Table III, "500% modulus" refers to the pounds per square inch pull in a tension test when the test piece has been stretched 500% of its original length. The "break" column represents the pounds per square inch pull at the point of rupture or break of the test piece undergoing the above mentioned 500% modulus tests. The "elongation" column represents the stretch or elongation at the point of "break." The "resilience" is the complement of the hysteresis loss, or more simply expressed is a measure of potential energy of a piece of rubber that is present as a result of applied stress and which is recoverable when the stress is removed.

TABLE III
Rubber tests

| Sample | Vulcanization at 260° F., minutes | Modulus, pounds per sq. inch, 500% | Break, pounds per square in. | Elongation, per cent | Resilience, per cent | Acetone extractable on original carbon black, per cent |
|---|---|---|---|---|---|---|
| B208 | 30 | 2,780 | 4,130 | 640 | 84.1 | 0.32 |
| B208 | 45 | | | | | |
| B208 | 60 | 3,480 | 4,060 | 565 | | |
| B208 | 90 | 3,814 | 3,985 | 515 | | |
| B343 | 30 | 2,710 | 3,800 | 620 | 84.6 | 4.00 |
| B343 | 45 | 3,130 | 3,945 | 590 | | |
| B343 | 60 | 3,400 | 4,090 | 580 | | |
| B343 | 90 | 3,700 | 3,984 | 530 | | |
| B216 | 30 | 2,015 | 4,340 | 715 | 83.6 | 2.75 |
| B216 | 45 | 2,270 | 4,300 | 655 | | |
| B216 | 60 | 2,400 | 4,175 | 647 | | |
| B216 | 90 | 2,560 | 3,835 | 613 | | |
| B234 | 30 | 2,190 | 4,715 | 695 | 84.1 | 1.75 |
| B234 | 45 | 2,545 | 4,180 | 645 | | |
| B234 | 60 | 2,740 | 4,035 | 630 | | |
| B234 | 90 | 3,060 | 3,900 | 575 | | |
| B229 | 30 | 2,570 | 3,880 | 620 | 83.8 | 0.35 |
| B229 | 45 | 2,855 | 4,010 | 610 | | |
| B229 | 60 | 3,150 | 3,955 | 580 | | |
| B229 | 90 | 3,520 | 3,790 | 525 | | |
| B221 | 30 | 1,980 | 4,520 | 722 | 83.6 | 2.30 |
| B221 | 45 | 2,150 | 4,480 | 710 | | |
| B221 | 60 | 2,270 | 4,350 | 682 | | |
| B221 | 90 | 2,485 | 4,185 | 645 | | |
| B225 | 30 | 2,155 | 4,630 | 700 | 82.7 | 4.00 |
| B225 | 45 | 2,380 | 4,670 | 660 | | |
| B225 | 60 | 2,580 | 4,400 | 630 | | |
| B225 | 90 | 2,780 | 4,070 | 575 | | |
| B228 | 30 | 2,390 | 4,520 | 700 | 80.9 | 0.04 |
| B228 | 45 | 2,700 | 4,170 | 640 | | |
| B228 | 60 | 3,040 | 4,180 | 610 | | |
| B228 | 90 | 3,440 | 4,045 | 560 | | |
| B330 | 30 | 2,455 | 3,905 | 657 | 83.3 | 0.30 |
| B330 | 45 | 2,930 | 3,900 | 608 | | |
| B330 | 60 | 3,150 | 3,800 | 582 | | |
| B330 | 90 | 3,470 | 3,800 | 540 | | |
| B312 | 30 | 1,785 | 4,140 | 730 | 84.6 | 2.81 |
| B312 | 45 | 2,345 | 4,300 | 670 | | |
| B312 | 60 | 2,815 | 4,300 | 645 | | |
| B312 | 90 | 2,820 | 4,015 | 617 | | |
| B334 | 30 | 2,055 | 4,280 | 660 | 81.1 | 0.30 |
| B334 | 45 | 2,145 | 4,445 | 625 | | |
| B334 | 60 | 2,445 | 4,400 | 605 | | |
| B334 | 90 | 2,645 | 4,180 | 532 | | |
| B322 | 30 | 2,515 | 4,065 | 670 | 78.2 | 0.05 |
| B322 | 45 | 3,180 | 4,230 | 625 | | |
| B322 | 60 | 3,415 | 4,300 | 580 | | |
| B322 | 90 | 3,720 | 4,025 | 530 | | |
| B333 | 30 | 2,730 | 4,020 | 640 | 84.5 | 0.35 |
| B333 | 45 | 3,280 | 4,145 | 585 | | |
| B333 | 60 | 3,500 | 3,980 | 565 | | |
| B333 | 90 | 3,785 | 3,785 | 500 | | |
| Channel black[1] | 30 | 2,300 | 4,135 | 700 | 76.7 | |
| Do[1] | 45 | 2,605 | 4,570 | 665 | | |
| Do[1] | 60 | 2,905 | 4,500 | 645 | | |
| Do[1] | 90 | 3,500 | 4,385 | 575 | | |

[1] Vulcanized at 274° F.

TABLE IV

*Rubber tests*

| Sample | Vulcanization at 300° F., minutes | Modulus, pounds per sq. inch, 600% | Break, pounds per square in. | Elongation, per cent | Resilience, per cent | Acetone extractable on original carbon black, per cent |
|---|---|---|---|---|---|---|
| B287 | 30 | 1,875 | 4,200 | 727 | 80.3 | 0 |
| B287 | 45 | 2,380 | 4,500 | 705 | | |
| B287 | 60 | 2,700 | 4,585 | 680 | | |
| B287 | 90 | 3,145 | 4,280 | 607 | | |
| B292 | 30 | 2,250 | 3,790 | 667 | 82.4 | 0 |
| B292 | 45 | 2,750 | 3,900 | 626 | | |
| B292 | 60 | 3,010 | 4,100 | 575 | | |
| B292 | 90 | 3,520 | 3,870 | 545 | | |
| B298 | 30 | 2,780 | 3,720 | 615 | 84.1 | 0 |
| B298 | 45 | 3,100 | 3,800 | 600 | | |
| B298 | 60 | 3,420 | 3,915 | 555 | | |
| B298 | 90 | 3,700 | 3,700 | 490 | | |
| B294 | 30 | 2,060 | 4,275 | 720 | 81.2 | .43 |
| B294 | 45 | 2,530 | 4,490 | 665 | | |
| B294 | 60 | 2,800 | 4,570 | 670 | | |
| B294 | 90 | 3,310 | 4,025 | 575 | | |
| B296 | 30 | 2,480 | 3,800 | 650 | 84.4 | .06 |
| B296 | 45 | 2,860 | 4,020 | 625 | | |
| B296 | 60 | 3,250 | 4,010 | 582 | | |
| B296 | 90 | 3,540 | 3,700 | 510 | | |
| B297 | 30 | 2,780 | 3,820 | 640 | 85.4 | .14 |
| B297 | 45 | 3,150 | 3,800 | 585 | | |
| B297 | 60 | 3,480 | 3,790 | 535 | | |
| B297 | 90 | 3,790 | 3,790 | 500 | | |
| Channel black [1] | 30 | 2,400 | 4,230 | 690 | 75.4 | |
| Do | 45 | 2,910 | 4,300 | 640 | | |
| Do | 60 | 3,284 | 4,800 | 620 | | |
| Do | 90 | 3,790 | 4,400 | 562 | | |

[1] Vulcanized at 274° F.

Upon consideration of the data of Tables III and IV, it can be seen that the carbon black samples made according to the process herein disclosed are substantially equal to and in some respects superior to the commercial channel black in quality. One of the outstanding properties of my carbon blacks is their ability to impart to vulcanized rubber high modulus values and at the same time high resilience values. This combination of properties is very extraordinary, as will be appreciated by those skilled in the art of rubber compounding, for high resilience values usually go hand-in-hand with low modulus values.

With a preheat temperature of 2000° F. inclusion of intermediate reactor 34 apparently had little effect on the properties of the rubber compounded from the carbon black made therein, the major effect resulting from the use of the chamber being a rather unexpected increase in yield of the carbon black.

With 1600° F. preheat the use of the intermediate reactor improved the quality of the carbon black for tread stock purposes. The prominent improvement was a large increase in the modulus. With this low preheat temperature the carbon black made according to the process herein disclosed but without the intermediate reactor was considerably below channel black in modulus, and with the intermediate reactor, particularly the 3 x 32 inch reactor, the black was in most cases equal to and in some cases superior to channel black in modulus.

In the process embodiment in which the reactant carbon-bearing gas is mixed with another gas before it enters the intermediate reactor, it is not necessary that the other gas be an oxygen-bearing gas as in the preferred method of operation described above. Any preheated gas such as nitrogen or flue gas can be used, in which case the gas carries sensible heat into the intermediate reactor, and partial combustion of the reactant gas as a source of additional heat is not relied upon. If a hot flue gas is used, it can be readily produced by combustion of a flue mixture in a separate chamber. It is not necessary that all gases entering the intermediate chamber be preheated. For example, practical considerations may make it desirable to preheat air, an inert gas, or flue gas to a very high temperature and to mix it with cold reactant gas in the mixing tube, with the resulting temperature of the mixture entering the intermediate chamber being the same as if both gases were preheated to a moderate temperature.

If a reactant gas alone is passed through the intermediate chamber it needs to be preheated to make the chamber effective as a soaking chamber. However, the intermediate chamber is valuable even when no preheat is used in the reactant gas. Thus, in one experiment without preheat in which a small mixing tube 16 served as the inlet tube to chamber 18, a yield of carbon black of only 3.4 pounds per 1000 cubic feet and high in acetone extractable matter was obtained, and carbon was deposited in chamber 18. In another experiment under the same conditions except that a 3 by 32 inch intermediate chamber served as the inlet tube, the yield per 1000 cubic feet was 4.0 pounds of carbon black relatively low in acetone extractable matter and no carbon was deposited in chamber 18. The experimental data apparently indicated that, in the absence of an intermediate chamber, the high velocity of the reactant gas in the inlet tube to chamber 18 was partly responsible for the relatively poor results obtained, and that the velocity produced by the use of the intermediate chamber improved the operation of the reaction chamber 18.

Relating to the apparatus or more particularly to the reaction chamber 18 as shown in the drawing, it is not intended to limit the chamber to the particular design shown. The shape does not necessarily need to be cylindrical, but may be more oval in section or even rectangular to square. The tangential burners, in the case of small chambers, may be limited to one, or in larger chambers may be two or more, the number depending on the size of the chamber. When several burners are used, they can be distributed along the length of the chamber, or they can be at the inlet and distributed around the circumference of the chamber. In this latter case, it may be desirable to give the fuel some velocity downstream with respect to the chamber by directing the burners at a slightly less angle than 90° to the longitudinal axis of the chamber. The burner ports can be of any shape such as round, oval or rectangular. A rectangular burner has an advantage over a round one in that a greater portion of the fuel stream enters tangentially with respect to the inside surface of the chamber, this being true in the case of burners with cross sections having a large ratio of length to width and with the longer dimension of the cross section parallel to the longitudinal axis of the chamber. In one embodiment, a large number of tangential openings may be provided in the lining of the chamber and supplied with fuel from an annular space surrounding the lining. In another embodiment, a single rectangular burner extending throughout the length of the chamber can be used.

The products issuing from the chamber 18 can be cooled by any conventional means, such as mixing with a cool inert gas such as nitrogen, or with a spray of water. The position of the point of introduction of the cooling gases or water spray depends on the desired time of exposure of the carbon product to the hot gaseous products of combustion from the tangential flame. If a separate quenching chamber is provided for each reaction chamber, it should preferably have about the same diameter as the chamber and have its axis in line with the axis of the reaction chamber. This arrangement permits the tangential flame to continue into the quenching chamber to keep the products in the central core from contacting solid surfaces until they are cooled.

A discussion of the ratio of the length to diameter of the reaction chamber is given fully in my previously filed applications cited above.

Other gases than air can be used with the reactant fuel as well as with the tangential fuel, for example, oxygen-enriched air or even oxygen alone.

As disclosed heretofore, my process is not limited to the use of natural gas as the carbon-containing gas, in addition, either dry gas, wet gas or raw gas as it comes from the well, or gasoline-extraction-plant or refinery-residue gas, heavier hydrocarbons, such as butane, or still heavier hydrocarbon products or fractions, or even normally liquid hydrocarbons, may be used, as for example, gas oil as above disclosed. Higher boiling oils than the gas oil of commerce may be used as a source of carbon, as well as lower boiling oils, such as the kerosene fraction, heavy or light naphthas, or even the gasoline-range hydrocarbons. In addition, such materials as low-temperature coal gas, coal-tar distillates and oil-shale gases and distillates may be used as charge stock to my process.

The air or gas, or both, in the fuel to the tangential burners can be preheated as a means of introducing more heat into the chamber. Fuel rich in air, or air alone, preferably preheated, can be used in any or all of the tangential burners. Enriching the said fuel with air was found to reduce the fuel rate required to keep the chamber walls free of carbon. When air alone is used in the tangential burners, the product has a grayish color in comparison to the very black channel product, but the yield of carbon black is high. As desired, the fuel mixture to the tangential burners may be allowed to burn within the chamber or in a separate combustion chamber, the hot combustion gases then being conducted tangentially into said chamber. Since the functions of the tangential gases are to furnish heat to the chamber walls and to prevent deposition of carbon thereon, it is immaterial at what point the combustion takes place, as long as the gases reach the chamber walls in a properly heated condition.

One advantage of my process over the prior art lies in the fact that it makes possible the rapid conversion of hydrocarbons to carbon black out of contact with solid surfaces in extremely short reaction times and without depending on maintenance of streamline flow. I have verified that even under turbulent flow conditions a tangential layer of gas can be maintained to separate the wall and the gas occupying the central core of a cylindrical reaction chamber. The presence of a tangential gaseous layer may be readily demonstrated by producing a yellow flame in the central core and then introducing air through one or more tangential ports, when a clear layer of air adjacent to the wall is visible. The thickness of this layer changes only little even if the amount of air introduced is two to three times the minimum required to establish the clear layer. This additional air over the minimum is apparently mixed with the reactant gas in the central core, and this fact is evidenced by the shortening of the yellow flame. If the air were introduced axially as a uniform layer next to the wall with a streamline flow in both the central flame and the air layer, a long diffusion flame results but a clear layer of air is maintained between the flame and the wall. However, as the velocities are increased into the turbulent flow range, the flame becomes shorter, the clear layer adjacent to the chamber walls disappears, and the flame is then in direct contact with the wall and carbon may be deposited thereon.

In my process, the operation at sufficiently high linear velocity of reactant gas as to give turbulent flow results in rapid transfer of heat into the moving body of reactant gas and decreases the time of reaction. This decreased time of reaction operates advantageously in my process since a much greater output of carbon black per chamber results, and a relatively large output of black per unit of chamber volume is characteristic of my reaction chamber and process of operation.

Operating under said turbulent flow conditions in the reactant gas stream has the advantage of making any given cross section of the stream normal to the direction of flow more nearly homogeneous, with respect to states of decomposition, combustion, and dilution. In contrast, a diffusion flame, characteristic of other carbon black making processes, is likely to have much tar and unreacted gas in the center, a surrounding layer of substantially decomposed gas carrying good quality carbon, and an outer layer of completely decomposed gas carrying overheated carbon.

When premixed fuel is used in the tangential burners, surface combustion of the chamber walls takes place thereby heating the walls to a very high temperature. These heated walls then heat the reactant gases by radiation. An appreciable part of this surface combustion goes to $CO_2$ and $H_2O$ and does not revert to CO and $H_2$ because the carbon forming reactants do not mix completely with the combustion products and because the time at elevated temperature is too short.

The tangential flame also has the function of diluting the products, particularly in the latter part of the chamber. This dilution decreases the concentration of any undecomposed hydrocarbons and thus lessens the chance for carbon particle growth between the chamber and the point in the cooling system at which the products are cooled to a temperature below which no further reaction is possible.

Mixing of the reactant gas and the tangential flame within the chamber itself has been found to play an important role in my process. In addition to aiding in heat transfer, such mixing improves the quality of the product, as for example, the amount of acetone extractable matter in the carbon black is readily controlled by regulating the extent of this mixing; the greater the extent of mixing, the less the acetone extractable.

Another advantage of this process over the prior art is its greater flexibility as to controlling the operation and as to control of the quality of product. The properties of the product can be varied over a wide range by adjusting the fuel rate to the tangential burner, the ratio of reactant air to reactant gas, gas and air preheat temperatures, reaction chamber temperature, and cooling of the chamber product, etc. Using my apparatus and the same raw materials, carbon black varying in properties from those of a soft "thermal decomposition" black to those of a hard "channel black" was produced.

While chambers varying in diameter from four and one-half inches to nine and one-half inches have been successfully used, as disclosed heretofore, I do not wish to limit my apparatus to these sizes since other sizes both smaller and larger may be used. For chambers of large diameters and corresponding length, such as would be used in commerce, the optimum number and arrangement of tangential burners would need be determined.

Materials of construction, as for example, preheat furnace tubes, reaction chamber insulation and lining, etc., may be selected from among those items commercially available and best suited to the operating conditions as herein disclosed without departing from the scope of my invention.

The disclosed values of operating temperatures, retention time, etc., are not intended to be limiting conditions, since experiments have indicated that operating conditions may be varied within wide limits while extraordinarily high yields of carbon black of quality in many respects equal to or superior to the channel black of commerce are produced.

While the preferred apparatus and method of operation for carrying out my invention are described in this specification, it will be obvious to those skilled in the art that there may be many possible variations of the apparatus and methods of operation as may be learned from operating experience and yet remain within the intended spirit and scope of my invention, and limited only by the following claims:

I claim:

1. An apparatus for producing carbon black comprising an unobstructed intermediate reactor having a closed inlet end wall carrying an inlet tube, a generally cylindrical side wall and an open outlet end; an unobstructed reaction chamber having an inlet end wall carrying an inlet tube, a generally cylindrical side wall and an open outlet end, the cross sectional area of the open outlet end being substantially the same as the cross sectional area of the cylindrical reaction chamber, the reaction chamber side wall carrying a burner opening near the inlet end wall of said chamber, the burner opening being so positioned as to direct gases passing therethrough in a direction tangent to the inner surface of the chamber side wall and essentially perpendicular to the longitudinal axis of said cylindrical chamber; and a cooling chamber provided with means for cooling the gases directly connected to said open outlet end of said reaction chamber for unobstructed passage of said gases thereinto; the open outlet end of the intermediate reactor being the inlet tube of the cylindrical reaction chamber; the longitudinal axes of the intermediate reactor inlet tube, the intermediate reactor and the cylindrical reaction chamber being essentially in line and the diameter of the intermediate reactor being substantially smaller than the diameter of the said reaction chamber whereby additional space is provided in said reaction chamber for flow of said tangentially directed gases therein without substantial constriction or enlargement of the stream of gases emerging from said intermediate reactor into said reaction chamber.

2. An apparatus for producing carbon black comprising an unobstructed intermediate reactor having a closed inlet end wall carrying an inlet tube, a generally cylindrical side wall and an open outlet end; an unobstructed reaction chamber having an inlet end wall carrying an inlet tube, a generally cylindrical elongated side wall and an open outlet end, the cross sectional area of the open outlet end being substantially the same as the cross sectional area of the cylindrical reaction chamber, the reaction chamber side wall carrying a plurality of burner openings at least one of which is positioned adjacent the inlet end wall, the said burner openings being so positioned as to direct gases passing therethrough in a direction tangent to the inner surface of the chamber side wall and essentially perpendicular to the longitudinal axis of the said reaction chamber; and a cooling chamber provided with means for cooling the gases directly connected to said open outlet end of said reaction chamber for unobstructed passage of said gases thereinto; the open outlet end of the intermediate reactor being the inlet tube of the cylindrical reaction chamber; the longitudinal axes of the intermediate reactor inlet tube, the intermediate reactor and the elongated cylindrical reaction chamber being essentially in line and the diameter of the intermediate reactor being substantially smaller than the diameter of the said reaction chamber whereby additional space is provided in said reaction chamber for flow of said tangentially directed gases therein without substantial constriction or enlargement of the stream of gases emerging from said intermediate reactor into said reaction chamber.

3. The continuous process of producing carbon black comprising introducing a stream of preheated reactant hydrocarbon in the gaseous state at a non-peripheral point in the inlet end wall of an intermediate reactor having an inlet end wall and a generally cylindrical side wall and an open outlet end, the reactant hydrocarbon being introduced in a direction parallel to the longitudinal axis of said intermediate reactor, maintaining the temperature in the intermediate reactor sufficiently high to crack the reactant hydrocarbon to increase the content of unsaturated hydrocarbon without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing a mixture of gaseous fuel and at least sufficient oxygen-containing gas for substantially complete combustion of said fuel into the reactor chamber near the inlet end wall through a burner port, burning the fuel-gas and air to maintain the temperature in the reactor chamber at the carbon black forming temperature, said burner port being so positioned in the side wall of the reactor chamber as to direct the flow of fuel and oxygen-containing gas in a direction tangent to the inner surface of the chamber side wall and essentially perpendicular to the longitudinal axis of said cylindrical reactor chamber, the mixture of fuel and oxygen-containing gas being introduced through said burner port at sufficiently high velocity and in sufficient quantity to maintain the flame and combustion products by centrifugal force adjacent the whole inner surface of the chamber side wall thus forming a separating layer of said flame and combustion products between the side wall and the intermediate reactor effluent in the reactor chamber, cooling the effluents of the reactor chamber to below the carbon cracking temperature and separating the carbon black from the products of combustion.

4. The continuous process of producing carbon black comprising introducing a stream of preheated reactant hydrocarbon in the gaseous state at a non-peripheral point in the inlet end wall of an intermediate reactor having an inlet end wall and a generally cylindrical side wall and an open outlet end, the reactant hydrocarbon being introduced in a direction parallel to the longitudinal axis of said intermediate reactor, maintaining the temperature in the intermediate reactor sufficiently high to crack the reactant hydrocarbon to increase the content of unsaturated hydrocarbon without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing oxygen-containing gas into the reactor chamber near the inlet end wall through a burner port, said burner port being so positioned as to direct the flow of said oxygen-containing gas in a direction tangent to the inner surface of the side wall of the reactor and with the predominating component of motion perpendicular to the longitudinal axis of said cylindrical chamber, said oxygen-containing gas and a portion of said reactant gaseous hydrocarbon mixing to form a combustible mixture, burning the mixture to maintain the temperature of the reactor chamber at the carbon black forming temperature, the oxygen-containing gas being introduced through said burner port at a sufficiently high velocity and in sufficient quantity to maintain by centrifugal force the flame and combustion products adjacent the whole inner surface of the reactor chamber side wall, thus forming a separating layer of said flame and combustion products between the side wall of the reactor and the gaseous hydrocarbon in the reactor chamber, cooling the effluents of the reactor chamber to below the carbon black forming temperature and separating the carbon black from the products of combustion.

5. The continuous process of producing carbon black comprising introducing a stream of reactant hydrocarbon in the gaseous state and reactant air at a non-peripheral point in the inlet end wall of an intermediate reactor having an inlet end wall and a generally cylindrical side wall and an open outlet end, the reactant hydrocarbon and reactant air being introduced in a direction parallel to the longitudinal axis of said intermediate reactor, the reactant hydrocarbon being greatly in stoichiometric excess of the reactant air, burning the combustible mixture formed by the reactant air and a portion of the reactant hydrocarbon to maintain the temperature in the intermediate reactor sufficiently high to crack the reactant hydrocarbon to increase the content of the unsaturated hydrocarbons without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing a mixture of gaseous fuel and at least sufficient oxygen-containing gas for substantially complete combustion of said fuel into the reactor chamber near the inlet end wall through a burner port, burning the fuel-gas and air to maintain the temperature in the reactor chamber at the carbon black forming temperature, said burner port being so positioned in the side wall of the reactor chamber as to direct the flow of fuel and oxygen-containing gas in a direction tangent to the inner surface of the chamber side wall and essentially perpendicular to the longitudinal axis of said cylindrical reactor chamber, the mixture of fuel and oxygen-containing gas being introduced through said burner port at sufficiently high velocity and in sufficient quantity to maintain the flame and combustion products by centrifugal force adjacent the whole inner surface of the chamber side wall thus forming a separating layer of said flame and combustion products between the side wall and the intermediate reactor effluent in the reactor chamber, cooling the effluents of the reactor chamber to below the carbon cracking temperature and separating the carbon black from the products of combustion.

6. The continuous process of producing carbon black comprising introducing a stream of reactant hydrocarbon in the gaseous state and reactant air at a non-peripheral point in the inlet end wall of an intermediate reactor having an inlet end wall and a generally cylindrical side wall and an open outlet end, the reactant hydrocarbon and reactant air being introduced in a direction parallel to the longitudinal axis of said intermediate reactor, the reactant hydrocarbon being greatly in stoichiometric excess of the reactant air, burning the combustible mixture formed by the reactant air and a portion of the reactant hydrocarbon to maintain the temperature in the intermediate reactor sufficiently high to crack the reactant hydrocarbon to increase the content of the unsaturated hydrocarbons without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing oxygen-containing gas into the reactor chamber near the inlet end wall through a burner port, said burner port being so positioned as to direct the flow of said oxygen-containing gas in a direction tangent to the inner surface of the side wall of the reactor and with the predominating component of motion perpendicular to the longitudinal axis of said cylindrical chamber, said oxygen-containing gas and a portion of said reactant gaseous hydrocarbon mixing to form a combustible mixture, burning the mixture to maintain the temperature of the reactor chamber at the carbon black forming temperature, the oxygen-containing gas being introduced through said burner port at a sufficiently high velocity and in sufficient quantity to maintain by centrifugal force the flame and combustion products adjacent the whole inner surface of the reactor chamber side wall, thus forming a separating layer of said flame and combustion products between the side wall of the reactor and the gaseous hydrocarbon in the reactor chamber, cooling the effluents of the reactor chamber to below the carbon black forming temperature and separating the carbon black from the products of combustion.

7. The continuous process of producing carbon black which comprises atomizing a gas-oil into a stream of preheated reactant hydrocarbon in the gaseous state whereby a reactant hydrocarbon mixture is formed, introducing the mixture of reactant hydrocarbon at a non-peripheral point in the inlet end wall of an intermediate reactor having an inlet end wall and a generally cylindrical side wall and an open outlet end, the reactant hydrocarbon mixture being introduced in a direction parallel to the longitudinal axis of said intermediate reactor, maintaining the temperature in the intermediate reactor sufficiently high to crack the reactant hydrocarbon mixture to increase the content of unsaturated hydrocarbon without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing a mixture of gaseous fuel and at least sufficient oxygen-containing gas for substantially complete combustion of said fuel into the reactor chamber near the inlet end wall through a burner port, burning the fuel-gas and air to maintain the temperature in the reactor chamber at the carbon black forming temperature, said burner port being so positioned in the side wall of the reactor chamber as to direct the flow of fuel and oxygen-containing gas in a direction tangent to the inner surface of the chamber side wall and essentially perpendicular to the longitudinal axis of said cylindrical reactor chamber, the mixture of fuel and oxygen-containing gas being introduced through said burner port at sufficiently high velocity and in sufficient quantity to maintain the flame and combustion products by centrifugal force adjacent the whole inner surface of the chamber side wall thus forming a separating layer of said flame and combustion products between the side wall and the intermediate reactor effluent in the reactor chamber, cooling the effluents of the reactor chamber to below the carbon cracking temperature and separating the carbon black from the products of combustion.

8. The continuous process of producing carbon black which comprises atomizing a gas-oil into a stream of preheated reactant hydrocarbon in the gaseous state whereby a reactant hydrocarbon mixture is formed, introducing the mixture of reactant hydrocarbon at a non-peripheral point in the inlet end wall of an intermediate reactor having an inlet end wall and a generally cylindrical side wall and an open outlet end, the reactant hydrocarbon mixture being introduced in a direction parallel to the longitudinal axis of said intermediate reactor, maintaining the temperature in the intermediate reactor sufficiently high to crack the reactant hydrocarbon mixture to increase the content of unsaturated hydrocarbon without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing oxygen-containing gas into the reactor chamber near the inlet end wall through a burner port, said burner port being so positioned as to direct the flow of said oxygen-containing gas in a direction tangent to the inner surface of the side wall of the reactor and with the predominating component of motion perpendicular to the longitudinal axis of said cylindrical chamber, said oxygen-containing gas and a portion of said reactant gaseous hydrocarbon mixing to form a combustible mixture, burning the mixture to maintain the temperature of the reactor chamber at the carbon black forming temperature, the oxygen-containing gas being introduced through said burner port at a sufficiently high velocity and in sufficient quantity to maintain by centrifugal force the flame and combustion products adjacent the whole inner surface of the reactor chamber side wall, thus forming a separating layer of said flame and combustion products between the side wall of the reactor and the gaseous hydrocarbon in the reactor chamber, cooling the effluents of the reactor chamber to below the carbon black forming temperature and separating the carbon black from the products of combustion.

9. The continuous process of producing carbon black which comprises atomizing a gas-oil into a stream of reactant hydrocarbon in the gaseous state whereby a reactant hydrocarbon mixture is formed, introducing the reactant hydrocarbon mixture along with reactant air at a non-peripheral point in the inlet end wall of an intermediate reactor having an inlet end wall, a generally cylindrical side wall and an open outlet end, the reactant hydrocarbon mixture and reactant air being introduced in a direction parallel to the longitudinal axis of said intermediate reactor, the reactant hydrocarbon mixture being greatly in stoichiometric excess of the reactant air, burning the combustible mixture formed by the reactant air and a portion of the reactant hydrocarbon mixture to maintain the temperature in the intermediate reactor sufficiently high to crack the reactant hydrocarbon mixture to increase the content of unsaturated hydrocarbons without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing a mixture of gaseous fuel and at least sufficient oxygen-containing gas for substantially complete combustion of said fuel into the reactor chamber near the inlet end wall through a burner port, burning the fuel-gas and air to maintain the temperature in the reactor chamber at the carbon black forming temperature, said burner port being so positioned in the side wall of the reactor chamber as to direct the flow of fuel and oxygen-containing gas in a direction tangent to the inner surface of the chamber side wall and essentially perpendicular to the longitudinal axis of said cylindrical reactor chamber, the mixture of fuel and oxygen-containing gas being introduced through said burner port at sufficiently high velocity and in sufficient quantity to maintain the flame and combustion products by centrifugal force adjacent the whole inner surface of the chamber side wall thus forming a separating layer of said flame and combustion products between the side wall and the intermediate reactor effluent in the reactor chamber, cooling the effluents of the reactor chamber to below the carbon cracking temperature and separating the carbon black from the products of combustion.

10. The continuous process of producing carbon black which comprises atomizing a gas-oil into a stream of reactant hydrocarbon in the gaseous state whereby a reactant hydrocarbon mixture is formed, introducing the reactant hydrocarbon mixture along with reactant air at a non-peripheral point in the inlet end wall of an intermediate reactor having an inlet end wall, a generally cylindrical side wall and an open outlet end, the reactant hydrocarbon mixture and reactant air being introduced in a direction parallel to the longitudinal axis of said intermediate reactor, the reactant hydrocarbon mixture being greatly in stoichiometric excess of the reactant air, burning the combustible mixture formed by the reactant air and a portion of the reactant hydrocarbon mixture to maintain the temperature in the intermediate reactor sufficiently high to crack the reactant hydrocarbon mixture to increase the content of unsaturated hydrocarbons without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing oxygen-containing gas into the reactor chamber near the inlet end wall through a burner port, said burner port being so positioned as to direct the flow of said oxygen-containing gas in a direction tangent to the inner surface of the side wall of the reactor and with the predominating component of motion perpendicular to the longitudinal axis of said cylindrical chamber, said oxygen-containing gas and a portion of said reactant gaseous hydrocarbon mixing to form a combustible mixture, burning the mixture to maintain the temperature of the reactor chamber at the carbon black forming temperature, the oxygen-containing gas being introduced through said burner port at a sufficiently high velocity and in sufficient quantity to maintain by centrifugal force the flame and combustion products adjacent the whole inner surface of the reactor chamber side wall, thus forming a separating layer of said flame and combustion products between the side wall of the reactor and the gaseous hydrocarbon in the reactor chamber, cooling the effluents of the reactor chamber to below the carbon black forming temperature and separating the carbon black from the products of combustion.

11. The continuous process of producing carbon black comprising introducing a stream of preheated reactant hydrocarbon in the gaseous state at a non-peripheral point in the inlet end wall of an intermediate reactor having an inlet end wall and a generally cylindrical side wall and an open outlet end, the reactant hydrocarbon being introduced in a direction parallel to the longitudinal axis of said intermediate reactor, further introducing directly into the intermediate reactor an atomized spray of gas-oil, maintaining the temperature in the intermediate reactor sufficiently high to crack the reactant hydrocarbon and atomized gas oil to increase the content of unsaturated hydrocarbon without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing a mixture of gaseous fuel and at least sufficient oxygen-containing gas for substantially complete combustion of said fuel into the reactor chamber near the inlet end wall through a burner port, burning the fuel-gas and air to maintain the temperature in the reactor chamber at the carbon black forming temperature, said burner port being so positioned in the side wall of the reactor chamber as to direct the flow of fuel and oxygen-containing gas in a direction tangent to the inner surface of the chamber side wall and essentially perpendicular to the longitudinal axis of said cylindrical reactor chamber, the mixture of fuel and oxygen-containing gas being introduced through said burner port at sufficiently high velocity and in sufficient quantity to maintain the flame and combustion products by centrifugal force adjacent the whole inner surface of the chamber side wall thus forming a separating layer of said flame and combustion products between the side wall and the intermediate reactor effluent in the reactor chamber, cooling the effluents of the reactor chamber to below the carbon cracking temperature and separating the carbon black from the products of combustion.

12. The continuous process of producing carbon black comprising introducing a stream of preheated reactant hydrocarbon in the gaseous state at a non-peripheral point in the inlet end wall of an intermediate reactor having an inlet end wall and a generally cylindrical side wall and an open outlet end, the reactant hydrocarbon being introduced in a direction parallel to the longitudinal axis of said intermediate reactor, further introducing directly into the intermediate reactor an atomized spray of gas-oil, maintaining the temperature in the intermediate reactor sufficiently high to crack the reactant hydrocarbon and atomized gas oil to increase the content of unsaturated hydrocarbon without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing oxygen-containing gas into the reactor chamber near the inlet end wall through a burner port, said burner port being so positioned as to direct the flow of said oxygen-containing gas in a direction tangent to the inner surface of the side wall of the reactor and with the predominating component of motion perpendicular to the longitudinal axis of said cylindrical chamber, said oxygen-containing gas and a portion of said reactant gaseous hydrocarbon mixing to form a combustible mixture, burning the mixture to maintain the temperature of the reactor chamber at the carbon black forming temperature, the oxygen-containing gas being introduced through said burner port at a sufficiently high velocity and in sufficient quantity to maintain by centrifugal force the flame and combustion products adjacent the whole inner surface of the reactor chamber side wall, thus forming a separating layer of said flame and combustion products between the side wall of the reactor and the gaseous hydrocarbon in the reactor chamber, cooling the effluents of the reactor chamber to below the carbon black forming temperature and separating the carbon black from the products of combustion.

13. The continuous process of producing carbon black comprising introducing a stream of reactant hydrocarbon in the gaseous state and reactant air at a non-peripheral point in the inlet end wall of an intermediate reactor having an inlet end wall and a generally cylindrical side wall and an open outlet end, the reactant hydrocarbon and reactant air being introduced in a direction parallel to the longitudinal axis of said intermediate reactor, further introducing directly into the intermediate reactor an atomized spray of gas-oil thus making a stoichiometric excess of reactant carbon over reactant air, burning the combustible mixture formed by the reactant air and a portion of the reactant hydrocarbon to maintain the temperature in the intermediate reactor sufficiently high to crack the reactant hydrocarbon to increase the content of the unsaturated hydrocarbons without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing a mixture of gaseous fuel and at least sufficient oxygen-containing gas for substantially complete combustion of said fuel into the reactor chamber near the inlet end wall through a burner port, burning the fuel gas and air to maintain the temperature in the reactor chamber at the carbon black forming temperature, said burner port being so positioned in the side wall of the reactor chamber as to direct the flow of fuel and oxygen-containing gas in a direction tangent to the inner surface of the chamber side wall and essentially perpendicular to the longitudinal axis of said cylindrical reactor chamber, the mixture of fuel and oxygen-containing gas being introduced through said burner port at sufficiently high velocity and in sufficient quantity to maintain the flame and combustion products by centrifugal force adjacent the whole inner surface of the chamber side wall thus forming a separating layer of said flame and combustion products between the side wall and the intermediate reactor effluent in the reactor chamber, cooling the effluents of the reactor chamber to below the carbon cracking temperature and separating the carbon black from the products of combustion.

14. The continuous process of producing carbon black comprising introducing a stream of reactant hydrocarbon in the gaseous state and reactant air at a non-peripheral point in the inlet end wall of an intermediate reactor having an inlet end wall and a generally cylindrical side wall and an open outlet end, the reactant hydrocarbon and reactant air being introduced in a direction parallel to the longitudinal axis of said intermediate reactor, further introducing directly into the intermediate reactor an atomized spray of gas-oil thus making a stoichometric excess of reactant hydrocarbon over reactant air, burning the combustible mixture formed by the reactant air and a portion of the reactant hydrocarbon to maintain the temperature in the intermediate reactor sufficiently high to crack the reactant hydrocarbon to increase the content of the unsaturated hydrocarbons without formation of carbon; introducing the effluent of the intermediate reactor at a non-peripheral point in the end wall of an unobstructed reactor chamber having an inlet end wall, a generally cylindrical side wall and an open outlet end, the cross sectional area of the open outlet end being substantially the same as the cross sectional area of the cylindrical reactor chamber, the intermediate reactor effluent being passed into said reactor chamber along the longitudinal axis thereof, introducing oxygen-containing gas into the reactor chamber near the inlet end wall through a burner port, said burner port being so positioned as to direct the flow of said oxygen-containing gas in a direction tangent to the inner surface of the side wall of the reactor and with the predominating component of motion perpendicular to the longitudinal axis of said cylindrical chamber, said oxygen-containing gas and a portion of said reactant gaseous hydrocarbon mixing to form a combustible mixture, burning the mixture to maintain the temperature of the reactor chamber at the carbon black forming temperature, the oxygen-containing gas being introduced through said burner port at a sufficiently high velocity and in sufficient quantity to maintain by centrifugal force the flame and combustion products adjacent the whole inner surface of the reactor chamber side wall, thus forming a separating layer of said flame and combustion products between the side wall of the reactor and the gaseous hydrocarbon in the reactor chamber, cooling the effluents of the reactor chamber to below the carbon black forming temperature and separating the carbon black from the products of combustion.

JOSEPH C. KREJCI.

CERTIFICATE OF CORRECTION.

Patent No. 2,375,797.   May 15, 1945.

JOSEPH C. KREJCI.

It is hereby certified that error appears in the printed specification of the above numbered patent requiring correction as follows: Page 3, second column, Table I, eigth column thereof, sixth numeral from top, for "2.3" read --3.2--; page 4, first column, line 42, for "conductive" read --conducive--; page 5, Table III, first column, twelfth item from bottom, for "B322" read --B332--; page 6, first column, line 57, after "The" insert --most--; and second column, line 37, for "flue" read --fuel--; page 12, first column, line 67, for "carbon" read --hydrocarbon--; and second column, line 4, for "and" before "being" read --end--; and that the said Letters Patent should be read with this correction therein that the same may conform to the record of the case in the Patent Office.

Signed and sealed this 16th day of October, A. D. 1945.

Leslie Frazer (Seal)   First Assistant Commissioner of Patents.

oxygen-containing gas being introduced through said burner port at a sufficiently high velocity and in sufficient quantity to maintain by centrifugal force the flame and combustion products adjacent the whole inner surface of the reactor chamber side wall, thus forming a separating layer of said flame and combustion products between the side wall of the reactor and the gaseous hydrocarbon in the reactor chamber, cooling the effluents of the reactor chamber to below the carbon black forming temperature and separating the carbon black from the products of combustion.

JOSEPH C. KREJCI.

CERTIFICATE OF CORRECTION.

Patent No. 2,375,797.   May 15, 1945.

JOSEPH C. KREJCI.

It is hereby certified that error appears in the printed specification of the above numbered patent requiring correction as follows: Page 3, second column, Table I, eigth column thereof, sixth numeral from top, for "2.3" read --3.2--; page 4, first column, line 42, for "conductive" read --conducive--; page 5, Table III, first column, twelfth item from bottom, for "B322" read --B332--; page 6, first column, line 57, after "The" insert --most--; and second column, line 37, for "flue" read --fuel--; page 12, first column, line 67, for "carbon" read --hydrocarbon--; and second column, line 4, for "and" before "being" read --end--; and that the said Letters Patent should be read with this correction therein that the same may conform to the record of the case in the Patent Office.

Signed and sealed this 16th day of October, A. D. 1945.

Leslie Frazer (Seal)   First Assistant Commissioner of Patents.